United States Patent
Jiang

(10) Patent No.: US 8,275,729 B2
(45) Date of Patent: Sep. 25, 2012

(54) VERIFICATION OF LINEAR HYBRID AUTOMATON

(75) Inventor: Shengbing Jiang, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1531 days.

(21) Appl. No.: 11/749,768

(22) Filed: May 17, 2007

(65) Prior Publication Data

US 2007/0271204 A1 Nov. 22, 2007

Related U.S. Application Data

(60) Provisional application No. 60/801,912, filed on May 19, 2006.

(51) Int. Cl.
G06F 17/00 (2006.01)
G06F 17/50 (2006.01)

(52) U.S. Cl. .................. 706/45; 703/2; 703/13; 706/19

(58) Field of Classification Search ........................ None
See application file for complete search history.

(56) References Cited

OTHER PUBLICATIONS

Alur, Henzinger, and Ho. Automatic Symbolic Verification of Embedded Systems. IEEE Transactions on Software Engineering, vol. 22, No. 3, Mar. 1996. pp. 181-201.*
Favela. Hybrid Automata Models in Continuous-Linear Hybrid Systems Analysis. Proceedings of the 1999 IEEE. pp. 11-16.*
Lin, Koutsoukos, and Antsaklis. HyStar: A ToolBox for Hierarchical Control of Piecewise Linear Hybrid Dynamical Systems. Proceedings of the American Control Conference, May 2002. pp. 686-691.*
Fainekos, Kress-Gazit, and Pappas. Hybrid Controllers for Path Planning: A Temporal Logic Approach. Proceedings of the 44th IEEE Conference on Decision and Control, and the European Control Conference 2005. pp. 4885-4890.*
R. Alur, T. Dang, and F. Ivancic. Counter-example guided predicate abstraction of hybrid system. In TACAS, vol. 2619 of LNCS. Springer, 2003.
G. Audemard, P. Bertoli, A. Cimatti, A. Komilowicz, and R. Sebastiani. A SAT Based Approach for Solving Formulas over Boolean and Linear Mathematical Propositions. In CADE-18: Conference on Automated Deduction, Copenhagen, Denmark, LNAI vol. 2392, Springer (2002), pp. 195210.
G. Audemard, M. Bozzano, a. Cimatti, and R. Sebastiani. Verifying Industrial Hybrid Systems with MathSAT. Electronic Notes in Theoretical Computer Science, vol. 119, Issue 2, Mar. 14, 2005, pp. 17-32 (Proc. BMC 2004, Boston, MA, Jul. 18, 2004).
G. Badros, A. Borning, and P. Stuckey. The Cassowary Linear Arithmetic Constraint Solving Algorithm. ACM Transactions on Computer Human Interaction, vol. 8 No. 4, Dec. 2001, pp. 267-306.
R. Bagnara, E. Ricci, E. Zaffanella, and P. Hill. Possibly not closed convex polyhedra and the Pharma Polyhedra Library. In Static Analysis: Proc. Int. Symp., vol 2477 of LNCS, Springer, 213229, 2002.
A. Biere, A. Cimatti, E. Clarke, and Y. Zhu. Symbolic model checking without BDDs. In Proc. of the Workshop on Tools and Algorithms for the Construction and Analysis of Systems (TACAS99), LNCS. Springer-Verlag, 1999.

(Continued)

Primary Examiner — Alan Chen

(57) ABSTRACT

The present invention provides a method for verification of linear hybrid automaton by generation an initial abstract model based on an original Linear-Time Temporal Logic (LTL) specification, validating a counterexample using an approach of linear constraints, identifying a fragment in the counterexample by iteratively applying an approach of linear constraints satisfaction in a limited number of times, and refining the original LTL specification based on the fragment derived.

20 Claims, 4 Drawing Sheets

OTHER PUBLICATIONS

E. Clarke, A. Fehnker, Z. Han, B. Krogh, J. Ouaknine, O. Stursberg, and M. Theobald. Abstraction and Counterexample-guided refinement in a model checking of hybrid systems. International Journal of Foundations of Computer Science, 14(4):583604, 2003.

J. R. Burch, E. M. Clarke, K. L. McMillan, D. L. Dill, abd J. Hwang. "Symbolic Model Checking: $10^{20}$ States and Beyond", J. Information and Computation, vol. 98, No. 2, pp. 142-170, Jun. 1992.

E. A. Emerson. Temporal and modal logic. In J. van Leeuwen, editor, Handbook of Theoretical Computer Science. Elsevier Science Publishers, 1990.

A. Fehnker, E. Clarke, S. Jha, B. Krogh. Refining Abstractions of Hybrid Systems Using Counterexample Fragments. In Proceedings of the Fifth International Workshop on Hybrid Systems: Computation and Control (HSCC), Lecture Notes in Computer Science 3414, Springer-Verlag, 2005, pp. 242-257.

G. Frehse, PHAVer: Algorithmic Verification of Hybrid Systems past HyTech. In Proceedings of the Fifth International Workshop on Hybrid Systems: Computation and Control (HSCC), Lecture Notes in Computer Science 3414, Springer-Verlag, 2005, pp. 258-273.

T. Henzinger. The theory of hybrid automata. In Proceedings of the 11th Annual Symposium on Logic in Computer Science (LICS), IEEE Computer Society Press, 1996, pp. 278-292.

T. Henzinger, P. Ho, and H. Wong-Toi. HyTech: A model checker for hybrid systems. Software Tools for Technology Transfer, 1:110-122, 1997.

T. Henzinger, J. Preussig, and H. Wong-Toi. Some lessons from the HyTech experience. In Proceedings of the 40th Annual Conference on Decision and Control (CDC), IEEE Press, 2001, pp. 2887-2892.

H. Kuhn. Solvability and consistency for linear equations and inequalities. American Mathematical Monthly, 63:217232, 1956.

\* cited by examiner

VERIFICATION OF LINEAR HYBRID AUTOMATON

CROSS REFERENCE TO RELATED APPLICATIONS

This application claims the benefit of U.S. Provisional Application No. 60/801,912 filed May 19, 2006, which is hereby incorporated herein by reference.

TECHNICAL FIELD

This invention relates to verification of linear hybrid automaton.

BACKGROUND OF THE INVENTION

Linear hybrid automaton is an important type of hybrid systems in the verification of embedded automotive control systems such as in the modeling and analysis of electrical and software architectures and in the robust verification of non-linear chassis control systems via approximation. Current methods for the verification of linear hybrid automata require performing a reachability search computation based on dynamic flow equations. A reachability search computation determines if a certain location is reachable or not, and if a run exists to reach the certain location. If no run exists, then the location is not reachable. However, there are some problems associated with the reachability computation approach such as arithmetic overflow, long computation time, and large memory.

Hybrid systems include both continuous and discrete state variables and they have been widely used as mathematical models for many important applications, such as manufacturing systems, air-traffic management systems, embedded automotive control systems, and real-time communication networks. Most of those applications are safety critical systems and require guarantees of safe operation. Consequently, the formal verification of hybrid systems is important for those safety critical applications.

A linear hybrid automaton is defined by a finite transition graph having nodes identified as locations, and edges identified as discrete transitions in combination with a set V of real variables. Continuous dynamics within each location are subject to a constant polyhedral differential inclusion (also called flow condition), i.e., dynamics of the form $\phi(\vec{v})$, where $\phi$ is a conjunction of linear constraints over first derivatives of variables in V. Discrete dynamics are modeled by the discrete transitions, each of which has a guard condition and a jump condition over V. A state in a LHA is a pair consisting of a location and a vector of variable values. A set of states is linear if it is definable using a linear predicate for each location, wherein a linear predicate is a set of expressions in a specified form.

For the analysis of LHA, research tools, such as a "HyTech tool disclosed in HyTech: A model checker for hybrid systems"; Software Tools for Technology Transfer, 1:110-122, 1997 by T. Henzinger, P. Ho, and H. Wong-Toi. The heart of HyTech is a procedure that attempts to compute reachable sets, by repeatedly computing successor sets until no new successor states are discovered. While HyTech is used to analyze a number of examples, it suffers from a number of problems as disclosed, for example, in "Some lessons from the HyTech experience"; In Proceedings of the 40th Annual Conference on Decision and Control (CDC), IEE Press, 2001, pp. 2887-2892 by T. Henzinger, J. Preussig, and H. Wong-Toi (hereinafter "HENZINGER"), which includes: (1) the size of reachable state space needed to store reachable sets may exceed available memory; (2) the analysis may require long computation time; (3) for certain LHA the reachable set is not linear and by visiting all reachable states, the HyTech will not terminate; (4) arithmetic overflow may occur because of the limited-precision arithmetic used. Some suggestions for improvement were proposed as disclosed, for example, in HENZINGER. As disclosed, for example, in "PHAVer: Algorithmic Verification of Hybrid Systems past HyTech"; In Proceedings of the Fifth International Workshop on Hybrid Systems: Computation and Control (HSCC), Lecture Notes in Computer Science 3414, Springer-Verlag, 2005, pp. 258-273 by G. Frehse, (hereinafter "FREHSE"), a research tool called PHAVer was developed for analyzing linear hybrid automata. PHAVer overcomes the overflow problem by using robust arithmetic based on the Parma Polyhedra Library (PPL). PHAVer also uses the approach of fixpoint computations over the system state space like HyTech. However, like HyTech, the PHAVer system also suffers from long computation times and large memory consumption for systems with a large number of continuous variables.

Counterexample guided abstraction refinement was used for the verification of hybrid systems as disclosed, for example, in "Abstraction and counterexample-guided refinement in model checking of hybrid systems"; International Journal of Foundations of Computer Science, 14(4):583604, 2003E by Clarke, A. Fehnker, Z. Han, B. Krogh, J. Ouaknine, O. Stursberg, and M. Theobald., (hereinafter "CLARKE1") and as disclosed, for example, in "Counter-example guided predicate abstraction of hybrid system"; In TACAS, volume 2619 of LNCS, Springer, 2003 by R. Alur, T. Dang, and F. Ivancic, (hereinafter "ALUR"), where it was for general hybrid systems as disclosed, for example, in CLARKE1 and was for linear dynamic hybrid systems as disclosed, for example, in ALUR. The abstraction models as disclosed, for example, in CLARKE1 and as disclosed, for example, in ALUR involve the state set representation, which was the representation of reachable state set as disclosed, for example, in CLARKE1 and the predicate representation of state set as disclosed, for example, in ALUR. Also the abstraction refinements as disclosed, for example, in CLARKE1 and as disclosed, for example, in ALUR are based on the infeasible prefix of the counterexample.

A concept called locally infeasibility is disclosed in ALUR, which could be viewed as the infeasibility caused by fragments with two transitions, but the general concept of fragment based abstraction refinement is not disclosed in ALUR.

Conventional counterexample fragment based abstraction refinement is applied for general hybrid systems as disclosed, for example, in "Refining Abstractions of Hybrid Systems Using Counterexample Fragments"; In Proceedings of the Fifth International Workshop on Hybrid Systems: Computation and Control (HSCC), Lecture Notes in Computer Science 3414, Springer-Verlag, 2005, pp. 242-257 by A. Fehnker, E. Clarke, S. Jha, B. Krogh, (hereinafter "FEHNKER"). The approach as disclosed, for example, in FEDNKER also involves the state set representation in an abstract model, wherein FEHNKER assumes that a set of fragments is given initially and then it may extend a given fragment later.

As disclosed, for example, in "Verifying Industrial Hybrid Systems with MathSAT"; Electronic Notes in Theoretical Computer Science, Volume 119, Issue 2, 14 Mar. 2005, Pages 17-32 (Proc. BMC 2004, Boston, Mass., Jul. 18, 2004) by G. Audemard, M. Bozzano, A. Cimatti, and R. Sebastiani. (hereinafter "AUDEMARD"), a method based on bounded model checking (BMC) and MathSAT was developed for the bounded reachability analysis of LHA. The method encodes all the paths in the system with lengths up to a certain length bound along with the reachability property into a math-formula, i.e., boolean combinations of boolean variables and linear (in)equalities over real variables. Then MathSAT solver is used to check the satisfiability of the math-formula. If the math-formula is satisfiable, then the reachability property holds; otherwise, the process continues by increasing the length bound and repeating the process until the MathSAT solver terminates or runs out of memory or time. The bounded reachability analysis of LHA cannot prove the unsatisfiability of certain reachability properties, like proving that some bad states can never be reached. The linear hybrid automaton model as disclosed, for example, in AUDEMARD requires that the flow conditions are directly given as constraints on variable value changes for certain time delay, i.e., besides the discrete transitions between different locations there is also a self-loop time elapse transition at each location to represent the variable value changes caused by the time elapses at the location. The above model as disclosed, for example, in AUDEMARD is different from the well known LHA model where the flow conditions are linear constraints over first derivatives of variables; and there is no proof on the equivalence of the above two different models for linear hybrid automaton.

A method of verification of linear hybrid automation (LHA) is needed that transforms an LHA into a linear transition system (LTS) and that uses concurrency for concurrent systems, thereby eliminating the need to perform and store reachable state computations.

SUMMARY OF THE INVENTION

The present invention provides a method for verification of linear hybrid automaton by generating an initial abstract model based on an original Linear-Time Temporal Logic specification, validating a counterexample using an approach of linear constraints satisfaction, identifying a fragment in the counterexample by iteratively applying the approach of linear constraints satisfaction in a limited number of times, and refining the original LTL specification based on the fragment derived.

BRIEF DESCRIPTION OF THE DRAWINGS

The invention may take physical form in certain parts and arrangement of parts, the preferred embodiment of which will be described in detail and illustrated in the drawings incorporated hereinafter, wherein.

DETAILED DESCRIPTION

Figure 1:
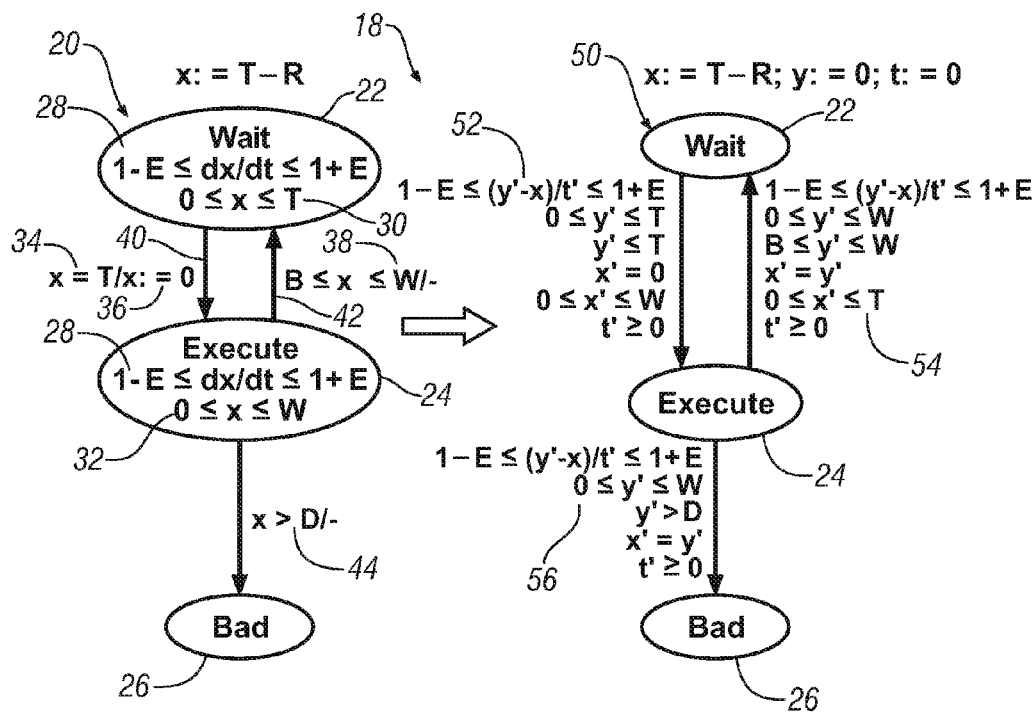
FIG. 1 is a state diagram illustrating a reduction of a linear hybrid automata (LHA) to a linear transition system (LTS) in accordance with one embodiment of the invention.

The invention includes a method of formal verification of embedded control systems using a reachability analysis of Linear Hybrid Automata (LHA). The formal verification system defines a software tool that is executed on a computer system having associated microprocessor means including an arithmetic processor and associated memory means.

The method of formal verification provides that the LHA is transformed or transferred into a linear transition system (LTS). A LTS is a finite or discrete transition graph in combination with a set of real variables. Unlike the LHA, the LTS does not have continuous dynamics. The LTS has only discrete dynamics, which are modeled by discrete transitions. Each discrete transition has a linear transition relation function that relates the variable values before and after the transition. The LHA reachability problem may be reduced to a LTS reachability problem using LTS reachability analysis. The reachability problem for hybrid systems modeled as linear hybrid automata (LHA).

The LTS reachability analysis includes defining a counterexample fragment based specification refinement by initially generating an initial abstract model for the given LTS. The abstract model includes an LTS discrete transition graph and does not have any representation of reachable state sets.

Next, the abstract model is checked for the reachability of a set of bad locations. If the abstract model passes the model checking, then the set of bad locations is not reachable in the original LTS; otherwise a counterexample will be generated. Then the counterexample is validated by checking the feasibility of the counterexample in the LTS, i.e., checking whether there is a corresponding run in the LTS for the counterexample. A linear constraint satisfaction problem results and may be solved by using methods like Linear Programming, Fourier-Motzkin Elimination method, or by computing the images/pre-images of affine transfer relations using Parma Polyhedra Library (PPL). If a run in the LTS exists for the counterexample, then the set of bad locations is reachable in the LTS and the run serves as a concrete counterexample; otherwise a process to identify a fragment in the counterexample that is infeasible in the LTS. Based on the counterexample fragment, the system specification may be refined.

For concurrent systems, instead of using one counterexample fragment for the specification refinement, a set of fragments obtained based on the system concurrency is used. Similar fragments are obtained and then use a linear-time temporal logic (LTL) formula $f_{frag}$ to encode associated system traces that contain a fragment in the fragment set before reaching any bad state. The specification to be verified is then refined, the original specification $G \neg Bad$ is refined to $(G \neg Bad) \vee f_{frag}$, which requires that any trace in the system either does not reach any bad state or contains a counterexample fragment before reaching any bad state, i.e., the trace either satisfies the initial specification or is infeasible in the original LTS.

The sequence of steps of model checking, counterexample validation, fragment identification, and specification refinement, is performed only once for the whole set of counterexample fragments derived from the system concurrency, instead of being performed repeatedly for every fragment in the set. After refining the specification, the abstract model is model checked against the refined specification and the process repeats until the process terminates or the computer having the verification of LHA software runs out of memory or time.

Arithmetic operations are needed in solving the linear constraint satisfaction problem. To avoid overflow, there are two options: either to use floating point numbers instead of integers or to use a robust arithmetic library capable of handling arbitrary precision. Because computing and storing the reachable state sets is not performed, the abstract model is stored instead. The abstract model is a discrete transition graph and the abstract model does not involve any state set representation. The method of the invention may prove particularly useful for systems with a large number of variables, which otherwise may require more computation time or storage space for the reachable state sets. Also because the process does not operate to find a fixpoint for the reachable state set, the termination of the process does not depend on whether the reachable state set is linear or not.

LTL is used to express the LHA system specification. The system and method of the invention verifies that the system can never reach a bad state given a LHA and a set of bad states. Formal verification for LHA is a proof that the system verified satisfies a given property under every possible condition, or else a counterexamnple is provided, wherein a counterexample is a trajectory in which the given property fails.

Using the atomic propositions and boolean connectives such as conjunction, disjunction, and negation, more expressions describing properties of states. Describing properties of sequences of states may be constructed using temporal or logical operators of a linear-time temporal logic (LTL). LTL temporal logic is a specific temporal logic formalism.

Let AP be a finite set of atomic proposition symbols. Using the atomic propositions and boolean connectives such as conjunction, disjunction, and negation, one can construct more expressions describing properties of states. Properties of sequences of states are expressed using temporal operators of a temporal logic. LTL temporal logic is a specific temporal logic formalism. The following temporal or logical operators are used in LTL for describing the properties along a specific trace: X ("next time"), U ("until"), F ("eventually" or "in the future"), G ("globally" or "always"), and B ("before"). LTL formulae are generated by rules P1-P3 given below:

P1—If p∈AP, then p is a LTL formula.
P2—If $f_1$ and $f_2$ are LTL formulae, then so are $\neg f_1$, $f_1 \vee f_2$, and $f_1 \wedge f_2$.
P3—If $f_1$ and $f_2$ are LTL formulae, then so are $Xf_1$, $f_1 U f_2$, $Ff_1$, $Gf_1$, and $f_1 B f_2$.

The semantics of LTL is defined over infinite proposition-traces. Let $\Sigma_{AP}=2^{AP}$, then $\Sigma_{AP}^*$ be the set of all finite proposition-traces over AP, and $\Sigma_{AP}^\omega$ be the set of all infinite proposition-traces over AP. For a LTL formula f and $\pi \in \Sigma_{AP}^\omega$, the notation $\pi \models f$ (resp., $\pi \not\models f$) means that f holds (resp., does not hold) along the infinite proposition-trace $\pi$. The relation $\models$ is defined inductively assuming that $f_1$ and $f_2$ are LTL formulae for $$\pi = (L_0(\pi)L_1(\pi)\ldots) \in \Sigma_{AP}^\omega, \pi^i = (L_i(\pi)\ldots) \text{ for any } i \geq 0.$$

1) If $f_1 \in AP$, then $\pi \models f_1$, $f_1 \in L_0(\pi)$
2) $\pi \not\models f_1$, $\neg(\pi \models f_1)$.
3) $\pi \models \neg f_1$, $\pi \not\models f_1$.
4) $\pi \models f_1 \vee f_2$, $\pi \models f_1$ or $\pi \models f_2$.
5) $\pi \models f_1 \wedge f_2$, $\pi \models f_1$ and $\pi \models f_2$.
6) $\pi \models Xf_1$, $\pi^1 \models f_1$.
7) $\pi \models f_1 U f_2$, $\exists k \geq 0$, $\pi^k \models f_2$ and $\forall j \in \{0, 1, \ldots k-1\}$, $\pi^j \models f_1$.
8) $\pi \models Ff_1$, $\exists k \geq 0$, $\pi^k \models f_1$.
9) $\pi \models Gf_1$, $\forall k \geq 0$, $\pi^k \models f_1$.
10) $\pi \models f_1 B f_2$, $\forall k \geq 0$ with $\pi^k \models f_2$, $\exists j \in \{0, 1, \ldots k-1\}$, $\pi^j \models f_1$.

Let $V = \{v_1, v_2, \ldots, v_n\}$ be a set of real-valued variables and $\vec{v} = (v_1, \ldots, v_n)$ be the vector representation of the variables. Let RelOps = $\{<, \leq, =, >, \geq\}$ be the set of binary relational operators. A linear term over V is a linear combination $\sum_{i=1}^n b_i v_1$ with rational constant coefficients $b_i$. A linear inequality over V is of the form $f(\vec{v}) \sim c$ with $f(\vec{v})$ being a linear term over V, $\sim \in$ RelOps, and c being a constant rational number. A linear predicate over V is a finite positive boolean combination of linear inequalities over V. A convex linear predicate over V is a finite boolean conjunction of linear inequalities over V. A valuation over $\vec{v}$ is a point $\vec{a} = (a_1, \ldots, a_n)$ in the n-dimensional real space $R^n$. A linear predicate $\phi$ and a valuation $\vec{a}$ over $\vec{v}$, $\phi[\vec{v} := \vec{a}]$, is defined for a truth value obtained by evaluating 0 with the constant $a_i$ replacing in $\phi$ all occurrences of the variable $v_1$, for each $i \in \{1, \ldots, n\}$. Every linear predicate $\phi$ over defines a set $[\phi] \subseteq R^n$ of valuations such that $[\phi] = \{\vec{a} \in R^n | \phi[\vec{v} := \vec{a}] = \text{true}\}$. It is easy to check that $[\phi]$ is a convex set if $\phi$ is a convex linear predicate.

Definition 1: A linear hybrid automaton (LHA) is a tuple A=(L, V, Σ, E, Init, flow, inv, guard, jump) consisting of the following components:

Locations L is a finite set of locations.
Variables $V = \{v_1, \ldots, v_n\}$ is a finite set of real-valued data variables. For each data variable $v_i$, the dotted variable $\dot{v}_i$ denotes the first derivative of $v_i$.

The state space of LHA is $L \times R^n$. Each state thus has the form $(l, \vec{a})$, where $l \in L$ is the discrete part of the state and $\vec{a} \in R^n$ is the continuous part.

Events Σ is a finite set of events.
Discrete transitions $E \subseteq L \times \overline{\Sigma} \times L$ is the set of discrete transitions, where $\overline{\Sigma} \times \cup \{\epsilon\}$ and $\epsilon$ is the null event associated only with a self-loop transition at each location, i.e., $(l_1, \epsilon, l_2) \in E$ if and only if $l_1 = l_2$. The above $\epsilon$ self-loop transition is introduced for the synchronous composition in concurrent systems defined later.

Initial state Init=$(l_0, \vec{a}_0)$ is the initial state with $l_0 \in L$ and $\vec{a}_0 = (a_{01}, a_{02}, \ldots, a_{0n}) \in R^n$.

Flow conditions. The flow function flow assigns each location $l \in L$ a convex linear predicate flow(l) over $\vec{\dot{v}}$ that constrains the rates at which the values of data variables change. More particularly, while the system is in the location l, the first derivatives of all data variables stay within the set [flow(l)].

Invariants. The invariant function inv assigns each location $l \in L$ a convex linear predicate inv(l) over v that constrains the values of data variables. While the system is in the location l, the values of all data variables stay within the set [inv(l)]. For the initial state $l_0$, $\vec{a}_0$), it is assumed that $\vec{a}_0 \in [inv(l_0)]$.

Guard conditions. The guard function guard assigns each transition $e = (l, \sigma, l') \in E$ a convex linear predicate guard(e) over $\vec{v}$ such that the transition $e = (l, \sigma, l')$ is enabled at a state $(l, \vec{a})$ if and only if $\vec{a} \in [guard(e)]$. Note that $\forall e = (l, \epsilon, l) \in E$, guard(e)=true.

Jump conditions. The jump function jump assigns each transition $e = (l, \sigma, l') \in E$ a convex linear predicate jump(e) over $\vec{v}$ and $\vec{v}'$ such that if the transition $e = (l, \sigma, l')$ is taken from a state $(l, \vec{a})$ to a state $(l', \vec{a}')$, then $\vec{a}$ and $\vec{a}'$ must be in [jump(e)], i.e., jump(e)[$\vec{v}:=\vec{a}$, $\vec{v}':=\vec{a}'$]=true. Note that $\forall e=(l,\epsilon,l)\in E$, jump(e)=($\vec{v}'=\vec{v}$).

The flow conditions, invariants, guarded conditions, and jump conditions associated with a LHA are linear.

A run in A is a (finite or infinite) sequence $r=((l_0, \vec{a}_0), (l_1, \vec{a}_1), \ldots, (l_i, \vec{a}_i) \ldots)$ such that there exists a sequence of events $(\sigma_0, \sigma_1, \ldots, \sigma_i, \ldots)$, $\forall i \geq 0$, $(l_i, \sigma_i, l_{i+1}) \in E$.

There exists a sequence of non-negative real numbers $(t_0, t_1, \ldots, t_i, \ldots)$ and a sequence of functions $(\vec{x}_0, \vec{x}_1, \ldots, \vec{x}_i, \ldots)$ where $\forall i \geq 0$, $\vec{x}_i:[0, t_i] \to R^n$, such that $\forall i \geq 0$, $\forall t \in [0, t_i]$, $\vec{x}_i(t) \in [\text{flow}(l_i)]$ $$\forall i \geq 0, \forall t \in [0, t_i], \left(\vec{a}_i + \int_0^t \vec{\dot{x}}_i(t)dt\right) \in [inv(l_i)]$$

$$\forall i \geq 0, \left(\vec{a}_i + \int_0^{t_i} \vec{\dot{x}}_i(t)dt\right) \in [guard((l_i, \sigma_i, l_{i+1}))]$$

$$\forall i \geq 0,$$

$$\text{jump}((l_i, \sigma_i, l_{i+1}))\left[\vec{v} := \vec{a}_i + \int_0^{t_i} \vec{\dot{x}}_i(t)dt, \vec{v}' := \vec{a}_{i+1}\right] = \text{true}.$$

Definition 2: A linear transition system (LTS) is a tuple $S=(L, V, I, \Sigma, E, \text{Init}, P)$, wherein L is the location set, V is the variable set, $\Sigma$ is the event set, E is the discrete transition set, and Init is the initial state respectively; and P is the transition relation function that assigns each transition in E a linear predicate over $\{v_1, v_2, \ldots, v_n, v_{1'}, v_{2'}, \ldots, v_{n'}\}$, i.e., $\forall e=(l, \sigma, l') \in E$, $P:e \mapsto p_e(\vec{v}, \vec{v}')$, which relates the variable values at locations l and l'.

A run in S is a (finite or infinite) sequence $r=((l_0, \vec{a}_0), (l_1, \vec{a}_1), \ldots, (l_i, \vec{a}_i), \ldots)$ such that there exists a sequence of events $(\sigma_{01}, \sigma_1, \ldots, \sigma_i, \ldots)$, $\forall i \geq 0$, $(l_i, \sigma_i, l_{i+1}) \in E$ and $p_{(l_i, \sigma_i, l_{i+1})}[\vec{v}:=\vec{a}_i, \vec{v}':=\vec{a}_{i+1}]$=true.

The transition trace associated with the run $r=((l_0, \vec{a}_0), (l_1, \vec{a}_1), \ldots, (l_i, \vec{a}_i)$ in a LHA A (or a LTS S) is $((l_0, \sigma_0, l_1), \ldots, (l_i, \sigma_i, l_{i+1}), \ldots)$. A location l' is called reachable in A (or S) if there exists a run in A (or S) with a transition trace $((l_0, \sigma_0, l_1), \ldots, (l_i, \sigma_i, l'))$. The set of transition traces associated with all finite-length runs in A (or S) is called the language of A (or S) and is denoted by L(A) (or L(S)). L(A) $\subseteq$ E* (or L(S) $\subseteq$ E*) and L(A) (or L(S)) are prefix closed.

The reachability problem of LHA (or LTS) may be described as: given a LHA A (or a LTS S) and a set of bad locations B $\subset$ L, check that whether the set B is reachable in A (or S) or not.

If the location set is the atomic proposition set, i.e., AP=L, then the set of bad locations B can be represented by a boolean formula Bad=$\vee_{l \in B} l$ over AP. Now, the reachability property may be represented by the LTL formula G¬Bad, and to perform the reachability analysis the LTL formula for the system is verified.

A system is called a concurrent system if it is a composition of a set of components/sub-systems. Composition for LHA and LTS are defined in more detail below.

Definition 3: Given a set of LHA $A_i=(L_i, V_i, \Sigma_i, E_i, \text{Init}_i, \text{flow}_i, \text{inv}_i, \text{guards}_i, \text{jump}_i)$, i=1, ..., k, the synchronous composition $A=\|_{i=1}^k A_i$ which is represented by $A=(L, V, \Sigma, E, \text{Init}, \text{flow}, \text{inv}, \text{guard}, \text{jump})$, is defined as follows:

$L=\times_{i=1}^k L_i$;
$V=\cup_{i=1}^k V_i$;
$\Sigma=\times_{i=1}^k \Sigma_i$;
$E=\{((l_1^i, \ldots, l_1^k), (\sigma^1, \ldots, \sigma^k), (l_2^1, \ldots, l_2^k)) | (l_1^i, \sigma^i, l_2^i) \in E_i, i=1, \ldots k, \text{Syn}((l_1^1, \sigma^1, l_2^1), \ldots, (l_1^k, \sigma^k, l_2^k))=1\}$, where Syn: $\times_{i=1}^k E_i \to \{0, 1\}$ is the synchronization function, and a set of transitions $\{e_i \in E_i, i=1, \ldots, l\}$ can be synchronized if and only if Syn$(e_1, \ldots, e_k)=1$;

Init=$((l_0^1, \ldots, l_0^k), (\vec{a}_0^1, \ldots, \vec{a}_0^k))$, where $(l_0^i, \vec{a}_0^i)$=Init$_i$;
$\forall l=(l^1, \ldots, l^k) \in L$, flow$(l)=\wedge_{i=1}^k \text{flow}_i(l^i)$;
$\forall l=(l^1, \ldots, l^k) \in L$, inv$(l)=\wedge_{i=1}^k \text{inv}_i(l^i)$;
$\forall e=((l_1^1, \ldots, l_1^k), (\sigma^1, \ldots, \sigma^k), (l_2^1, \ldots, l_2^k)) \in E$, guard$(e)=\wedge_{i=1}^k \text{guard}_i((l_1^i, \sigma^i, l_2^i))$;
$\forall e=((l_1^1, \ldots, l_1^k), (\sigma^1, \ldots, \sigma^k), (l_2^1, \ldots, l_2^k)) \in E$, jump$(e)=\wedge_{i=1}^k \text{jump}_i((l_1^i, \sigma^i, l_2^i))$.

The definition of LHA synchronous composition is defined above based on the synchronization function Syn. It appears in the above definition that for the composite system to execute a transition, every component should execute a transition, which seems to exclude the composition by interleaving executions of transitions from different component LHA's. However, as mentioned in Definition I the discrete transition set $E_i$ in each component LHA $A_i$ includes a self-loop transition $(l^i, \epsilon, l^i)$ at every location $l^i$. A composite transition may result from the synchronization of some non-$\epsilon$ transitions and some $\epsilon$ transitions from different component LHA's. Thus, the definition of synchronous composition does include the case of interleaving execution composition.

Similar to Definition 3, Definition 4 defines a concurrent LTS.

Definition 4: Given a set of LTS $S_i=(L_i, V_i, \Sigma_i, \text{Init}_i, P_i)$, i=1, ..., k, the synchronous composition $S=\|_{i=1}^k S_i$ is represented by $S=(L, V, \Sigma, E, \text{Init}, P)$, where L, V, $\Sigma$, E, and Init are the same as in Definition 3, and P is defined as follows:

$\forall e=(l_1^1, \ldots, l_1^k), (\sigma^1, \ldots, \sigma^k), (l_2^1, \ldots, l_2^k)) \in E$,
$P(e)=\wedge_{i=1}^k P_i((l_1^i, \sigma^i, l_2^i))$ Given a LHA A=(L, V, $\Sigma$, E, Init, flow, inv, guard, jump), we can construct the following LTS $S_A$=(L, W, $\Sigma$, E, Init$_s$, P), which is called the LTS reduction of A, where W=V$\cup$U$\cup\{t_{pre}\}$ with U=$\{u_1, \ldots, u_n\}$, and let $\vec{w}$=$(u_1, \ldots, u_n, t_{pre}, v_1, \ldots, v_n)$ Init$_s$=$(l_0, \vec{\beta}_0)$ with $\vec{\beta}_0$=$(0, \ldots, 0, a_{01}, \ldots, a_{0n})$, and the transition relation function P is given as: $\forall e=(l_0, \vec{\beta}_0) \in E$, $p_e(\vec{w}, \vec{w}')$=$((\text{flow}(l)|_{\vec{v} \leftarrow (\vec{u}'-\vec{v})/t_{pre}'} \wedge (t_{pre}'>0)) \vee ((\vec{u}'=\vec{v}) \wedge (t_{pre}'=0))) \wedge \text{inv}(l)|_{\vec{v} \leftarrow \vec{u}'} \wedge \text{guard}(e)|_{\vec{v} \leftarrow \vec{u}'} \wedge \text{jump}(e)|_{\vec{v} \leftarrow \vec{u}', \vec{v}' \leftarrow \vec{v}'} \wedge \text{inv}(l')|_{\vec{v} \leftarrow \vec{v}'}$, where flow$(l)|_{\vec{v} \leftarrow (\vec{u}'-\vec{v})/t_{pre}'}$ is the predicate derived by replacing $\vec{v}$ in flow(l) with $(\vec{u}'-\vec{v}')/t_{pre}'$, and the same notation $|_{\leftarrow}$ applies to all the other predicates in $p_e(\vec{w}, \vec{w})$. Also note that if the flow condition is in the form of $c_1 \leq \Sigma_{i=1}^m b_i v_i \leq c_2$ the above condition of $((\text{flow}(l)|_{\vec{v}(\vec{u}-\vec{v})/t_{pre}'} \wedge (t_{pre}'>0)) \vee ((\vec{u}'=\vec{v}) \wedge (t_{pre}'=0)))$ could be simplified as flow$(l)|_{\vec{v} \leftarrow (\vec{u}'-\vec{v})/t_{pre}'} \wedge (t_{pre}' \geq 0)$. In order to handle the case of $t_{pre}'=0$, every inequality in flow$(l)|_{\vec{v} \leftarrow (\vec{u}'-\vec{v})/t_{pre}'}$ is modified by multiplying $t_{pre}'$ at the both sides of the inequality, i.e., every inequality $f((\vec{u}'-\vec{v})/t_{pre}') \sim c$ is replaced by $f((\vec{u}'-\vec{v})/t_{pre}') * t_{pre}' \sim c * t_{pre}'$, which is actually $f(\vec{u}'-\vec{v}) \sim c*t_{pre}'$ because $f((\vec{u}'-\vec{v})/t_{pre}')$ is a linear term over $(\vec{u}'-\vec{v})/t_{pre}'$.

The variable set of $S_A$ is W=V$\cup$U$\cup\{t_{pre}\}$ with $U=\{u_1, \ldots, u_n\}$. The vector $\vec{v}$ represents the variable values just after the system executes a transition and enters the current location, $\vec{u}$ represents the variable values just before the system executes a transition and enters the current location, and $t_{pre}$ represents the time that the system spends at the preceding location before entering the current location. The initial values of $\vec{v}$, $\vec{u}$, and $t_{pre}$ are given as $\vec{v} = \vec{a}_0$, $\vec{u} = \vec{0}$, and $t_{pre} = 0$, which gives us the initial state Init$_s$.

For further explanation of the above reduction, assume that the LHA executes a transition $e = (l, \sigma, l') \in E$ and enters the location $l'$ from the location $l$. Then $\vec{v}$ and $\vec{u}$ represent the variable values after and before the system enters the locations $l$ respectively, $\vec{v}'$ and $\vec{u}'$ represent the variable values after and before the system enters the locations $l'$ respectively, and $t_{pre}$ and $t_{pre}'$ represent the time that the system spends at the preceding locations before entering the locations $l$ and $l'$ respectively. For the above assumed execution of transition $(l, \sigma, l')$, $\vec{v}$ and $\vec{u}'$ represent the variable values when the system enters and leaves the locations $l$ respectively, $t_{pre}'$ represents the time that the system spends at the location $l$ before entering the location $l'$, and $\vec{u}'$ and $\vec{v}'$ represent the variable values before and after the system executes the transition $(l, \sigma, l')$. The guard condition guard(e) for $e = (l, \sigma, l')$ in the original LHA A is captured in $S_A$ by guard(e)$|_{\vec{v} \leftarrow \vec{u}'}$, in $p_e(\vec{w}, \vec{w}')$ over $\vec{u}'$, the jump condition jump(e) in A is captured in $S_A$ by jump(e)$|_{\vec{v} \leftarrow \vec{u}', \vec{v}' \leftarrow \vec{v}'}$ in $p_e(\vec{w}, \vec{w}')$ over $\vec{u}'$, and $\vec{v}'$, the invariant conditions inv(l) and inv(l') in A are captured in $S_A$ by inv(l)$|_{\vec{v} \leftarrow \vec{u}'}$ over $\vec{u}'$ and inv(l')$|_{\vec{v} \leftarrow \vec{v}'}$ over $\vec{v}'$, the flow condition flow(l) in A is captured in $S_A$ by ((flow(l)$|_{\vec{v} \leftarrow (\vec{u}' - \vec{v})/t_{pre}'} \wedge (t_{pre}' > 0)) \vee ((\vec{u}' = \vec{v}) \wedge (t_{pre}' = 0)))$ in $p_e(\vec{w}, \vec{w}')$.

Theorem 1: $L(A) = L(SA)$.

Proof of Theorem 1: To show that there exists a run $r = ((l_0, a_0), \ldots, (l_i, \vec{a}_i), \ldots)$ in A if and only if there exists a run $r_s = ((l_0, \vec{\beta}_0), \ldots, (l_i, \vec{\beta}_i), \ldots)$ in $S_A$ with the same associated transition trace for r. From the above construction of $S_A$ and the fact that the invariant conditions inv in A are convex, it is not difficult to verify that if $r_s = ((l_0, \vec{\beta}_0), \ldots, (l_i, \vec{\beta}_i), \ldots)$ is a run in $S_A$ then $r = ((l_0, \vec{\beta}_0 |_{\vec{v}}), \ldots, (l_i, \vec{\beta}_i |_{\vec{v}}), \ldots)$ is a run in A, where $\vec{\beta}_i |_{\vec{v}}$ is the projection of $\vec{\beta}_i$ to $\vec{v}$, and the two runs have the same associated transition trace. Next, suppose $r = ((l_0, \vec{a}_0), \ldots, (l_i, \vec{a}_i), \ldots)$ is a run in, A it means that there exists a sequence of events $(\sigma_0, \ldots, \sigma_i, \ldots)$, a sequence of non-negative real numbers $(t_0, \ldots, t_i, \ldots)$, and a sequence of functions $(\vec{x}_0, \ldots, \vec{x}_i, \ldots)$ such that along the run r, $tr = ((l_0, \sigma_0, l_1), \ldots, (l_i, \sigma_i, l_{i+1}), \ldots)$ is the associated transition trace, $t_i$ is the time the system spends at the location $l_i$ and $\vec{x}_i$ is the flow function for $\vec{v}$ at the location $l_i$ with flow(l_i)$[\vec{v} := \vec{x}_i(t)]$=true for any $t \in [0, t_i]$. Let $$r_s = \left( (l_0, \vec{\beta}_0), \left( l_i, \vec{\beta}_i |_{\vec{v} = \vec{a}_i}, t_{pre} = t_{i-1}, \vec{u} = \vec{a}_{i-1} + \int_0^{t_{i-1}} \dot{\vec{x}}_{i-1}(t) dt \right), \cdots \right),$$

where $$\forall i \geq 1, \vec{\beta}_i |_{\vec{v} = \vec{a}_i}, t_{pre} = t_{i-1}, \vec{u} = \vec{a}_{i-1} + \int_0^{t_{i-1}} \dot{\vec{x}}_{i-1}(t) dt$$

is the value for $\vec{w}$ obtained by letting $\vec{v} = \vec{a}_i$, $t_{pre} = t_{i-1}$, and $$\vec{u} = \vec{a}_{i-1} + \int_0^{t_{i-1}} \dot{\vec{x}}_{i-1}(t) dt.$$

Prove that the above $r_s$ is a run in $S_A$ with the transition trace tr includes showing that $$\text{flow}(l_i) \bigg|_{\vec{v} \leftarrow (\vec{u}' - \vec{v})/t_{pre}'} \left[ \vec{v} := \vec{a}_i, t_{pre}' := t_i, \vec{u}' := \vec{a}_i + \int_0^{t_i} \dot{\vec{x}}_i(t) dt \right] = \text{true},$$

which is equivalent to show $$\text{flow}(l_i) \left[ \vec{v} := \int_0^{t_i} \dot{\vec{x}}_i(t) dt / t_i \right] = \text{true}.$$

Since flow(l_i)$[\vec{v} := \dot{\vec{x}}_i(t)]$=true for any $t \in [0, t_i]$ and flow(l_i) is a linear predicate over $\vec{v}$, it follows directly that $$\text{flow}(l_i) \left[ \vec{v} := \int_0^{t_i} \dot{\vec{x}}_i(t) dt / t_i \right] = \text{true}.$$

An LTS is a special form of LHA without continuous dynamics. Given an LTS $S = (L, V, \Sigma, E, \text{Init}, P)$, a corresponding LHA $A = (L, V, \Sigma, E, \text{Init}, \text{flow}, \text{iv}, \text{guard}, \text{jump})$, wherein the first five components $(L, V, \Sigma, E, \text{Init})$ are the same as in S, and $\forall l \in L$, [ flow(l)]=$\{\vec{0} \in R_n\}$ and [inv(l)]=$R^n$, $\forall e = (l, \sigma, l') \in E$, guard(e) is the boolean conjunction of all linear inequalities in $p_e(\vec{v}, \vec{v}')$ that are over V only and jump(e) is the boolean conjunction of the rest linear inequalities in $p_e(\vec{v}, \vec{v}')$. It follows directly from the definitions of LHA and LTS that $L(A) = L(S)$. Thus, there is a language equivalence relation between LHA and LTS, i.e., given an LHA A there exists an LTS S such that $L(S) = L(A)$ and vice versa.

FIG. 1 shows an embodiment of the invention for a state diagram 18 illustrating reduction of a LHA model system 20 to a LTS 50. The LHA system 20 has three locations 22, 24, 26 defining descrete states: Wait, Execute, and Bad. Location 22 defines an initial state "Wait" defined by flow condition 28: $1 - E \leq dx/dt \leq 1 + E$, and an Invariant 30 $0 \leq x \leq T$. Location 24 defines an Execute state defined by flow condition 28 and an invariant 32, $0 \leq x \leq W$. The state Bad at location 26 should never be reached. Thus, the LHA system is verified to ensure that the Bad state is never reached. The guard and jump conditions 34, 36, respectively define the transition events 40 between Wait and Execute. The guard condition 38 $B \leq x \leq W$ defines transition event 42 between Execute and Wait. The guard condition 44 $x \leq D$ defines a transition event between Execute and Bad.

The continuous dynamic constants are defined as follows: a period T, a release phase R, a clock drift effect E, a best case execution time B, a worst case execution time W, and a deadline D (assuming $D > W$). The value of the continuous variable $x := T - R$ is defined at an initial state.

The LTS 50 reduced from the LHA 20 is shown in FIG. 1. The LTS 50 includes three discrete conditions Wait, Execute and Bad that correspond to the locations 22, 24 and 26 associated with the LHA 20. However, the flow conditions 28 and invariants 30, 32 are removed from each location. A set of linear equations 52, 54, 56 defining new values are associated with each transition event to replace the guard and jump conditions associated with the LHA.

Continuous variables associated with the LTS include x, a value upon entering a current location; y, a value upon leaving the preceding location; and t, a time at the preceding location. Initially, x:T–R; y:=0, and t:=0.

Theorem 2 correlates to Theorem 1 and Definitions 3 and 4.

Theorem 2: Given a set of LHA $\{A_i, i=1, \ldots, k\}$, let $S_{A_i}$ be the corresponding LTS reduction of each $A$., the variable set of each $S_{A_i}$ is $W_i = V_i \cup U_i \cup \{t_{pre}\}$, i.e., the variable $t_{pre}$ is a global variable for all $S_{A_i}$, and the synchronization function is the same for $\{A_i, i=1, \ldots, k\}$ and $\{S_{A_i}, i=1, \ldots, k\}$, then we have $L(\|_{i=1}^k A_i) = L(\|_{i=1}^k S_{A_i})$.

From Theorem 2, the reachability problem for the concurrent LHA $\|_{i=1}^k A_i$ can be reduced to one for the concurrent LTS $\|_{i=1}^k S_{A_i}$.

Reachability Analysis of LTS.

For the reachability analysis of LTS, an abstraction based approach with counterexample fragment guided specification refinement is developed. Given an LTS $S = \|_{i=1}^k S_{A_i}$, a reachability analysis process is provided.

Figure 2:
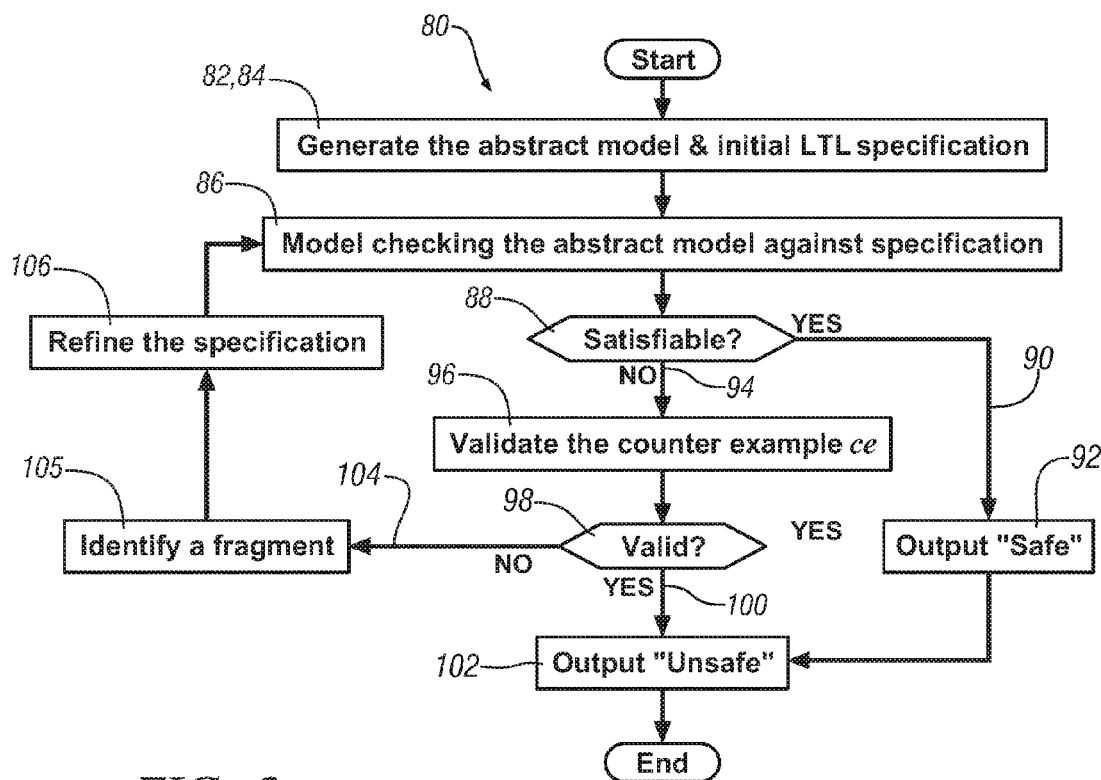
FIG. 2 is a flow-chart illustrating a process of formal verification of embedded control systems using a LTS.

FIG. 2 illustrates a flow chart of a reachability analysis process (80) in accordance with an embodiment of the invention.

Initially, an abstract model (82) and an initial LTL specification $f = G \neg Bad$ (84), are generated, wherein the abstract model is in the form of a Kripke structure.

The abstract model is model checked against the LTL specification (86). A determination is made if the abstract model satisfies the LTL specification (88). If the LTL specification is satisfied (90) then the process terminates with a safe output (92) specifying that "The system satisfies the specification". Thus, the set of bad locations is not reachable in the LTS if the abstract model passes the model checking.

If the LTL specification is not satisfied (94), then the generated counterexample (ce) is validated (96). A determination is made whether the ce is valid i.e., feasible (98). If the ce is feasible in the LTS, then the process terminates (100) with an unsafe output (102) specifying that "The system does not satisfy the specification" along with the concrete counterexample obtained by the validation.

If the ce is not valid, (104), then a fragment in the counterexample that is infeasible in the original LTS is identified (105).

The LTL specification is then refined based on the counterexample fragment (106). Once the LTL specification is refined (106), then the determination if the abstract model is model checked against the LTL specification (86) and steps (86), (88), (94), (96), (98), (104), and (106) reiteratively repeat unless the LTL specification is satisfied (90) or if a ce is feasible in the LTS (100).

In (86), the standard model checking is applied.

In an embodiment of the invention, a Kripke structure is used as the abstract model for LTS. First we assume that all the transition relation functions in LTS are convex, otherwise for a transition $e = (l, \sigma, l')$ with a non-convex relation function $p_e$, let $p_e$ be in the disjunctive form of $p_e = \vee_{j=1}^J p_e^j$ with each $p_e^j$ being convex, then we can replace the transition $e = (l, \sigma, l')$ by a set of new transitions $\{e^j = (l, \sigma^j, l'), 1 \leq j \leq J\}$ with new events $\sigma^j$ and the transition relation function for each $e^j$ is $p_e^j$. Next, for each LTS $S_{A_i} = (L_i, W_i, \Sigma_i, E_i, Init_i, P_i)$, $i=1, \ldots, k$, a corresponding abstract model is the Kripke structure $C_i = (X_i, x_i^0, R_i, label_i)$ with the atomic proposition set $AP_i = L_i \cup E_i$, where $X_i = E_i$ is the set of states, $x_i^0 = (l_0^i, \epsilon, l_0^i)$ is the initial state, $R_i = \{((l_{11}, \sigma_1, l_{12}), (l_{21}, \sigma_2, l_{22})) \in X_i \times X_i | l_{12} = l_{21}\}$ is the transition relation, and $label_i: X_i \to 2^{AP_i}$ is the labeling function such that $\forall (l_1, \sigma, l_2) \in X_i, label_i((l_1, \sigma, l_2)) = \{l_2, (l_1, \sigma, l_2)\}$ if $\sigma$ is not in the form of $e^j$; otherwise $label_i((l_1, \sigma, l_2)) = \{l_2, (l_1, \sigma, l_2), (l_1, \epsilon, l_2)\}$.

The synchronous composition $C = \|_{i=1}^k C_i$ is defined based on the synchronization function Syn as follows. The synchronous composition of $C_i$ ($i=1, \ldots, k$) is the Kripke structure $C = (X, x^0, R, label)$ with the atomic proposition set $AP = \cup_{i=1}^k AP_i$, where $X = \{(x^1, \ldots, x^k) \in x_{i=1}^k X_i | Syn(x^1, \ldots, x^k) = 1\} \cup \{(x_1^0, \ldots, x_k^0)\}$ $x^0 = (x_1^0, \ldots, x_k^0)$, $R = \{((x^1, \ldots, x^k), (y^1, \ldots, y^k)) \in X \times X | (x^i, y^i) \in R_i, i=1, \ldots, k\}$ and $\forall (x^1, \ldots, x^k) \in X, label((x^1, \ldots, x^k)) = \cup label_i(x^i)$.

From this it is verifiable that $\forall \pi = (((l_0^1, \ldots, l_0^k), (\sigma_0^1, \ldots, \sigma_0^k), l_1^1, \ldots, l_1^k)), \ldots, ((l_1^1, \ldots, l_1^k), (\sigma_i^1, \ldots, \sigma_i^k), (l_{i+1}^1, \ldots, l_{i+1}^k)), \ldots) \in L(\|_{i=1}^k S_{A_i})$, $\pi' = (((l_0^1, \epsilon, l_1^0), \ldots, (l_0^k, \epsilon, l_0^k)), ((l_0^1, \sigma_0^1, l_1^1), \ldots, (l_0^k, \sigma_0^k, l_1^k)), \ldots, ((l_i^1, \sigma_i^1, l_{i+1}^1), \ldots, (l_i^k, \sigma_i^k, l_{i+1}^k)), \ldots)$ is a state trace in $C = \|_{i+1}^k C_i$.

In other words, the discrete behavior of the LTS $S = \|_{i=1}^k S_{A_i}$ is contained in the Kripke structure C. So the Kripke structure C does serve as an abstraction of the LTS S.

For a given bad location set $B \subset L$, $L = x_{i=1}^k L_i$, the initial specification is the LTL formula $f = G \neg Bad$ with $Bad = \vee_{(l^1, \ldots, l^k) \in B}(\wedge_{j=1}^I l^j)$.

Figure 3:
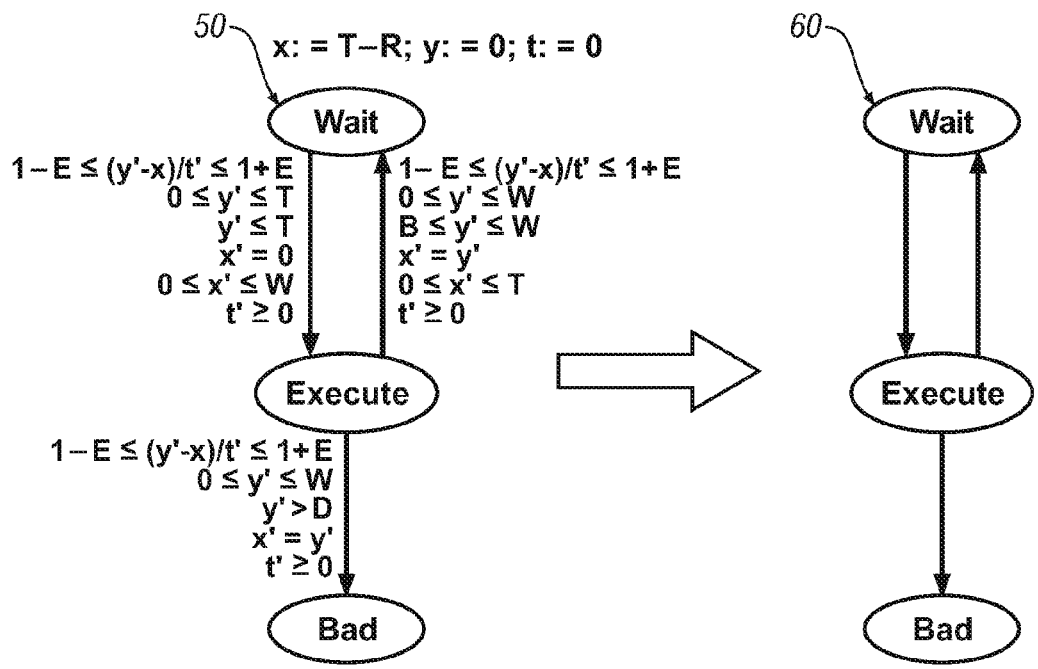
FIG. 3 is a flow-chart illustrating a method of creating an abstract model of the LTS in FIG. 1.

FIG. 3 illustrates a state diagram of the process (82), (84) of generating an abstract model 82 and an initial LTL specification (84). FIG. 3 is an embodiment illustrating an abstraction model of a linear transition system, which is a hybrid system including both continuous and discrete variables. The continuous variables are abstracted out of the LTS model 50 and an abstract model 60 having only discrete states is generated. The discrete abstract model includes three states: Wait, Execute and Bad. An initial f LTL specification is created by associating atomic propositions with the abstract model. A set of atomic propositions AP for an initial LTL specification is AP={Wait, Execute, Bad} and the initial specification, $f = \neg Bad$ (globally not bad). Thus, the property for f is that any trace in the LTS should never reach the bad state.

Counterexample Validation

In (86) of process (80), the abstract model 60 is model checked (86) against the specification f, as shown in FIG. 2.

A counterexample is then generated if the abstract model 60 does not satisfy the specification f. Then the counterexample is validated by checking the feasibility of the counterexample in the LTS, i.e., checking whether there is a corresponding run in the LTS for the counterexample. A linear constraint satisfaction problem results and may be solved by using methods like Linear Programming, Fourier-Motzkin Elimination method, or by computing the images/pre-images of affine transfer relations using Parma Polyhedra Library (PPL). If a run in the LTS exists for the counterexample, then the set of bad locations is reachable in the LTS and the run serves as a concrete counterexample; otherwise a process to identify a fragment in the counterexample that is infeasible in the LTS. Based on the counterexample fragment, the system specification may be refined.

Figure 4:
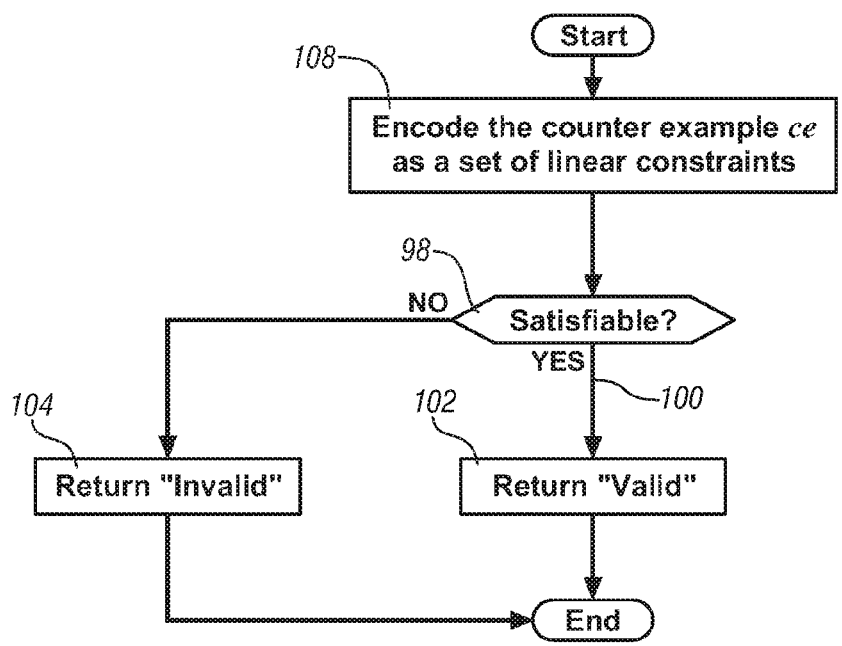
FIG. 4 is a state diagram validating counterexample of the abstract model shown in FIG. 3.

A determination (88) is made whether the abstract model satisfies the LTL specification. If the abstract model does satisfy the LTL specification (90), then the set of bad locations is not reachable in the original LTS and a safe output (92) is generated. FIGS. 2 and 4 illustrate flow charts defining the counterexample validation process. When 60 does not satisfy f, a counterexample, ce is generated and is encoded (108) into the system as a set of linear constraints as is shown in more detail in FIG. 4.

Figure 5:
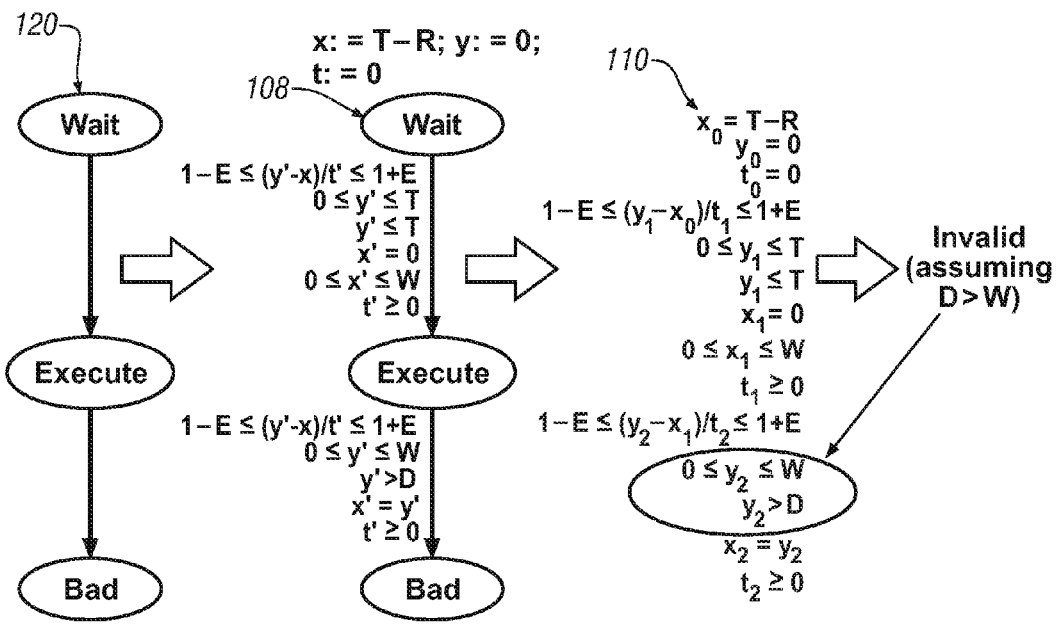
FIG. 5 is a flow-chart illustrating a process of validating of a counter example of the abstract model shown in FIG. 3.

FIG. 5 illustrates a state diagram of verification of a ce process in accordance with an embodiment of the invention. Initially, a ce 120 is generated. The counterexample is encoded as a set of linear constraints as shown in (108) in FIGS. 4-5. A determination is made whether the ce is feasible in LTS, wherein original constraints are inserted into the ce.

A determination is made of whether the ce is satisfied (98), using Linear Programming. If two or more of the constraints conflict, the ce is not valid.

In an embodiment of the invention shown in FIG. 5, a ce 120 is generated and has three discrete states, Wait, Execute and Bad.

The counterexample in C is a trace $ce=(((l_0^1,\epsilon,l_1^0), \ldots, (l_0^k,\epsilon,l_0^k)), ((l_0^1,\sigma_0^1,l_1^1), \ldots, (l_0^k,\sigma_0^k,l_1^k), \ldots, ((l_{m-1}^1, \sigma_{m-1}^1, l_m^1), \ldots, (l_{m-1}^k, \sigma_{m-1}^k, l_m^k))$ with $(l_m^1, \ldots, l_m^k) \in B$. To validate the counterexample ce in S ($S=\|_{i=1}^k S_{A_i}$), the feasibility of ce in S is checked to determine whether ce is a run in S, which can be reduced to a linear constraint satisfaction problem. Thus, a determination is made whether the corresponding trace $\pi=(((l_0^1, \ldots, l_0^k), (\sigma_0^1, \ldots, \sigma_0^k), (l_1^1, \ldots, l_1^k)), \ldots, ((l_{m-1}^1, \ldots, l_{m-1}^k), (\sigma_{m-1}^1, \ldots, \sigma_{m-1}^k), (l_m^1, \ldots, l_m^k)))$ is in L(S). The validation is equivalent to checking whether a sequence of $((\vec{a}_1^1, \ldots, \vec{a}_1^k), \ldots, (\vec{a}_m^1, \ldots, \vec{a}_m^k))$ exists such that $r=(((l_0^1, \ldots, l_0^k), (\vec{a}_0^1, \ldots, \vec{a}_0^k)), \ldots, ((l_m^1, \ldots, l_m^k), (\vec{a}_m^1, \ldots, \vec{a}_m^k)))$ is a run in S with $\pi$ as its associated transition trace, which further requires that $\wedge_{i=0}^{m-1} \wedge_{i=1}^k P_j((l_i^j, \sigma_i^j, l_{i+1}^j))[\vec{v}:=\vec{a}_i^j, \vec{v}':=\vec{a}_{i+1}^j]=$true.

A check is made whether the set of linear constraints $\cup_{i=0}^{m-1}\cup_{j=1}^k P_j((l_i^j,\sigma_i^j,l_{i+1}^j))[\vec{v}L=\vec{a}_{i+1}^j]$ is satisfiable or not (88). So the counterexample validation problem is reduced to a linear constraint satisfaction problem, which can be solved by methods like Linear Programming, Fourier-Motzkin Elimination method, or by computing the images/pre-images of affine transfer relations using Parma Polyhedra Library (PPL).

If ce is feasible in S, then the bad location set B is reachable in S, and the corresponding run in S serves as the concrete counterexample. Thus, if the ce is feasible then, the ce is satisfied, i.e. valid (102) and a bad location set B, or state is reachable and does not satisfy the initial specification f= G¬Bad. A "valid" output (102) is sent to the system to specify that the ce is feasible. If the ce is not satisfiable (104) then an "invalid" output is sent to the system.

Fragment Identification

Where the counterexample is infeasible in C, i.e., there is no solution for the set of linear constraints associated with the counterexample, then a fragment of the counterexample that is infeasible in S is found (104) for refining the specification (106).

If a Fourier-Motzkin Elimination method or the image/pre-image computation by PPL is used to validate the counterexample, then the fragment identification is just another application of the above methods. If a counterexample $ce=(x_0, \ldots, x_m)=(((l_0^1,\epsilon,l_0^1), \ldots, (l_0^k,\epsilon,l_0^k)), ((l_0^1,\sigma_0^1,l_1^1), \ldots, ((l_{m-1}^1,\sigma_{m-1}^1,l_m^1), \ldots, (l_{m-1}^k,\sigma_{m-1}^k,l_m^k))$ in C, is provided using a Fourier-Motzkin Elimination method or the image/pre-image computation by PPL, ce may be validated by solving the linear constraint satisfaction problem incrementally, i.e., to check whether $\wedge_{j=1}^k P_j((l_i^j,\sigma_i^j,l_{i+1}^j))[\vec{v}L=\vec{a}_i^j, \vec{v}L=\vec{a}_{i+1}^j]$=true either from i=0 to i=m-1 or from i=m-1 to i=0. If the checking process is performed from i=0 to i=m-1, the checking continues until a number k≦m-1 is found such that the prefix $pce=(x_0, \ldots, x_k, x_{k+1})$ of ce is infeasible in S. Then to identify a fragment the same process is applied again to pee backwards, i.e., to check whether $\wedge_{j=1}^k P_j((l_i^j,\sigma_i^j,l_{i+1}^j))[\vec{v}:=\vec{a}_i^j, \vec{v}':=\vec{a}_{i+1}^j]$=true from i=k to i=0 until we find another number k'>0 is found such that $(x_{k'}, \ldots, x_{k+1})$ is infeasible in S, and frag=$(x_{k'}, \ldots, x_{k+1})$ is returned as the fragment identified. If an incremental linear constraint solving process is used to validate the counterexample, then a minimal conflict set of constraints will be returned by the process if the counterexample is infeasible. Based on the conflict constraint set, a fragment may be identified.

If Linear Programming by simplex method is used to validate the counterexample, then the following process may be used for fragment identification.

Figure 6:
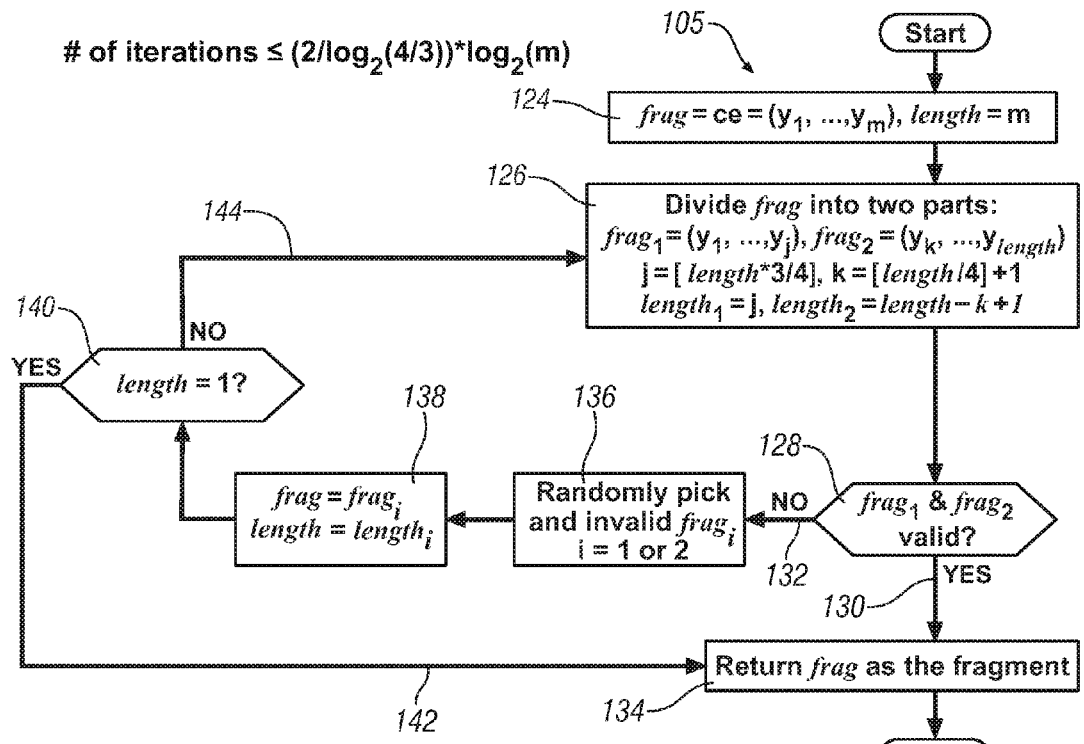
FIG. 6 is a flow-chart illustrating a process of identifying a fragment of an invalid counterexample.

Given an infeasible counterexample $ce=(x_0=((l_0^1,\epsilon,l_0^1), \ldots, (l_0^k,\epsilon,l_0^k)), x_1=((l_0^1,\sigma_0^1,l_1^1), \ldots, (l_0^k,\sigma_0^k,l_1^k)), \ldots, x_m=((l_{m-1}^1,\sigma_{m-1}^1,l_m^1), \ldots, (l_{m-1}^k,\sigma_{m-1}^k,l_m^k))$, the process for fragment identification (122) is shown in a flowchart an embodiment illustrated in FIG. 6.

Initially a frag is set equal to a whole ce, wherein frag=$((y_1, \ldots, y_{length}))$, length=m, and $y_i=x_i$ for all i=1, …, m.

Divide frag into two parts (126) frag$_1$ and frag$_2$, wherein frag$_1=(y_1, \ldots, y_j)$ and frag$_2=(y_k, \ldots, y_{length})$, wherein j=⌊length*¾⌋ and wherein k=⌈length/4⌉+1 with length$_1$=j being the length of frag$_1$ and length$_2$=length−k+1 being the length of frag$_2$.

Determine if both frag$_1$ and frag$_2$ are valid (128). If frag$_1$ and frag$_2$ are valid (130) then frag$_i$, wherein i=1 or 2, is feasible in S and the process (122) is terminated and frag is output as the fragment identified (134); otherwise randomly pick one invalid fragment frag$_i$ from frag$_1$ and frag$_2$, then let frag=frag$_i$ and length=length$_i$ (138), and go to (126) if length>1.

In the process (105) the length of frag$_i$ is ⌊length*¾⌋ and the length of frag$_2$ is length−⌈length/4⌉, wherein both frag$_1$ and frag$_2$ are less than or equal to length*¾. The worst case for the complexity of the process (122) is that the final fragment has a length of 1 (142) and every time both frag$_1$ and frag$_2$ need to be validated.

A determination is made (140) if frag$_{i\ or\ j}$ has a length equal to 1.

If the length is not equal to 1 (144), then, the process (126) is iteratively repeated until both frag$_1$ frag$_2$ valid (134) or until the length of an invalid or infeasible fragment is equal to 1 (142).

If the length is equal to 1 (142), then frag is identified as the fragment (134). For a given counterexample with a length m, the number of iterations of fragment validations by Linear Programming in the process (122) is at most N=2*n with $(¾)^n m=1$, i.e., N(2/log$_2$(4/3))*log$_2$(m). Because ⌊length*3/4⌋−⌈length/4⌉≧⌊length/2⌋−1, any infeasible sub-fragment in frag with a length less than or equal to ⌊length/2⌋−1 is contained in either frag$_1$ or frag$_2$.

One fragment is selected instead of always first picking frag$_1$ or frag$_2$. The reason for selecting one fragment is disclosed as follows. Consider a system with the discrete transition graph of (L, E), where L={$l_0,l_1,\ldots,l_4$} and E={($l_0,l_1$), ($l_0,l_1$), ($l_1,l_2$), ($l_2,l_3$), ($l_3,l_3$), ($l_3,l_4$)} (assuming the event set is empty). Suppose the following holds for the system:

∀i≧0, and ($l_0,l_1$), ($l_1,l_1$)$^i$, ($l_1,l_2$)) are (($l_2,l_3$), ($l_3,l_3$)$^i$, ($l_3,l_4$)) are infeasible;

(($l_1,l_2$), ($l_2,l_3$)) is infeasible;

∀i≧0, (($l_0,l_1$), ($l_1,l_1$)$^i$), (($l_1 m_1$)$^i$, ($l_1 m_1 2$)), (($l_2,l_3$), ($l_3,l_3$)$^i$), and (($l_3,l_3$)$^i$, ($l_3,l_4$)) are feasible.

To verify that $l_4$ is not reachable from $l_0$. If (136) of the process (105) selects either $frag_1$ or $frag_2$, then the fragments either $((l_0,l_1), (l_1,l_1)^i, (l_1,l_2))$ or $((l_2,l_3), (l_3,l_3)^i, (l_3,l_4))$, $i=0, 1, \ldots$, are found in subsequent executions of (136). This is because in model checking the abstract model against the refined specification, the counterexample generated will always contain the fragment $((l_0,l_1), (l_1,l_1)^{i+1}, (l_1,l_2))$ or $((l_2, l_3), (l_3,l_3)^{i+1}, (l_3,l_4))$. So process (80) will not terminate. The above is also true if Fourier-Motzkin Elimination method, or the image/pre-image computation by PPL, or the incremental linear constraint solving algorithm like Cassowary is used for the fragment identification, either forward or backward.

Because of the random selection in (136) of process (105), the fragment $(l_1,l_2,l_3)$ will be found eventually. After the specification refinement based on the fragment $(l_1,l_2,l_3)$, $l_4$ is not reachable from $l_0$ in the next round model checking. So process (80) will terminate for the above example eventually.

Figure 7:
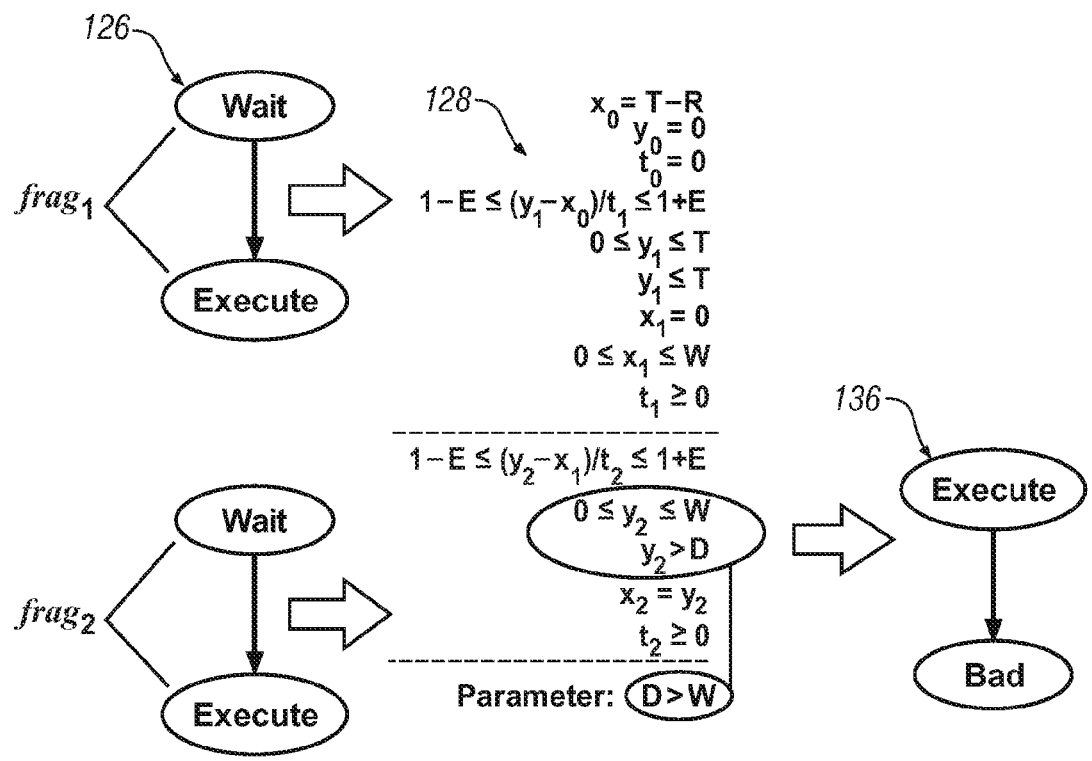
FIG. 7 is a state diagram of identifying an invalid fragment of the invalid counterexample of the abstract model shown in FIG. 5.

FIG. 7 illustrates a state diagram of the process (105) of identifying a fragment. Fragment frag={Wait, Execute, Bad} is divided into $frag_1$ and $frag_2$ (126), wherein $frag_1$={Wait, Execute} and $frag_2$={Execute, Wait}. Validation is performed (128) on both fragments $frag_1$ and $frag_2$ to determine if linear constraints of the LTS are satisfied. As shown in FIG. 7, linear constraints $0 \leq y_2 \leq W$ and $y_2 > D$, and $D > W$ are not satisfiable. Thus, $frag_2$ is picked (136) as an invalid fragment.

Specification Refinement

Suppose a counterexample fragment is identified, wherein $frag=(((l_{i_1}^1, \sigma_{i_1}^1, l_{i_1}^1+1), \ldots, (l_{i_1}^k, \sigma_{i_1}^k, l_{i_1}^k+1)), \ldots, (((l_{i_2}^1, \sigma_{i_2}^1, l_{i_2}^1+1), \ldots, (l_{i_2}^k, \sigma_{i_2}^k, l_{i_2}^k+1))$ in the counterexample ce with $0 \leq i_1 \leq i_2 \leq m-1$ such that $\wedge_{i=i_1}^{i_2} \wedge_{j=1}^k P_j((l_i^j, \sigma_i^j, l_{i+1}^j))$ is not satisfiable. A set of fragments from frag is derived based on the system concurrency and then the set of fragments are used to refine the specification 106 instead of refining the abstract model.

Let $Set_{frag} \cup_{i=i_1}^{i_2} \cup_{j=1}^k \{P_{ij} | P_{ij} P_j((l_i^j, \sigma_i^j, l_{i+1}^j))\}$ denote the set of linear constraints for frag. By using an incremental linear constraint solving process like Cassowary as disclosed, for example, in "The Cassowary Linear Arithmetic Constraint Solving Algorithm"; ACM Transactions on Computer Human Interaction, Vol, 8 No. 4, Dec. 2001, pages 267-306 by G. Badros, A. Borning, and P. Stuckey, a minimal conflict constraint set is obtained, wherein the constraint set $Set_{min} \subseteq Set_{frag}$ such that $\wedge_{P_{ij} \in Set_{min}} P_{ij}$ is unsatisfiable and for any strict subset Sub of $Set_{min}$, Sub $\subset Set_{min}$, $\wedge_{P_{ij} \in Sub} P_{ij}$ is satisfiable.

Let $O_i = \{j | P_{ij} \in Set_{min}, j=1, \ldots, k\}$ be the subscript index set for $P_{ij}$ in $Set_{min}$, $i=i_1, \ldots, i_2$. The following theorem is based on the system concurrency.

Theorem 3: Given a concurrent LTS $S = \|_{i=1}^k S_{A_i}$, let $C = \|_i^k C_i = (X, x^0, R, \text{label})$ be its Kripke structure abstraction, $frag = ((x_{i_1}^1, \ldots, x_{i_1}^k), \ldots, (x_{i_2}^1, \ldots, x_{i_2}^k))$ be a counterexample fragment in C for the LTL specification $G \neg Bad$ representing a safety property, $Set_{frag}$ be the constraint set associated with frag, $Set_{min} \subseteq Set_{frag}$ be the minimal conflict constraint set of $Set_{frag}$ with the subscript index sets of $O_i$, $i=i_1, \ldots, i_2$, then the following results hold:

1) For any state sequence (not necessarily from the initial state) $seq=((y_{i_1}^1, \ldots, y_{i_1}^k), \ldots, y_{i_2}^1, \ldots, y_{i_2}^k))$ in C, if $\forall i \in \{i_1, \ldots, i_2\}$, $\forall j \in O_i$, $y_i^j = x_i^j$, then seq is a counterexample fragment.

2) For any state sequence (not necessarily from the initial state) $seq=((y_{i_1}^1, \ldots, y_{i_1}^k), \ldots, (y_{h-1}^1, \ldots, y_{h-1}^k), (y^1, \ldots, y^k), (y_h^1, \ldots, y_h^k), \ldots, (y_{i_2}^1, \ldots, y_{i_2}^k))$ in C $(i_1 \leq h \leq i_2)$, if $\forall i \in \{i_1, \ldots, i_2\}$, $\forall j \in O_i$, $y_i^j = x_i^j$, and $\forall j \in O_h$, $(l_h^j, \epsilon, l_h^j) \in label_j(y^j)$, where $l_h^j$ is the starting location in $x_h^j$, i.e., $x_h^j = (l_h^j, \sigma_h^j, l_{h+1}^j))$, then seq is a counterexample fragment.

3) For any state trace (from the initial state) z in C, if $\pi$ satisfies the LTL formula $f_{frag}$, then $\pi$ contains a counterexample fragment before reaching any bad state, where $f_{frag}$ is defined as:

$$f_{frag} = \neg Bad \ U f_{i_1}$$

$$f_i = \wedge_{j \in O_i} x_i^j \wedge \neg Bad \wedge X((\wedge_{j \in O_{i+1}} (l_{i+1}^j, \epsilon, l_{i+1}^j) \wedge \neg Bad) U f_{i+1}),$$

$$i = i_1, \ldots, i_2 - 1$$

$$f_{i_2} = \wedge_{j \in O_{i_2}} x_{i_2}^j$$

From the Theorem 3, a set of fragments may be obtained from a given fragment frag, and the LTL formula $f_{frag}$ encodes all the system traces that contain a counterexample fragment in the fragment set before reaching any bad state. Next, the specification is refined (106) from "$G \neg Bad$" to "$(G \neg Bad) \vee f_{frag}$", which means that any trace in the abstract model does not contain any bad state location sets and thus, is infeasible in the original LTS.

Figure 8:
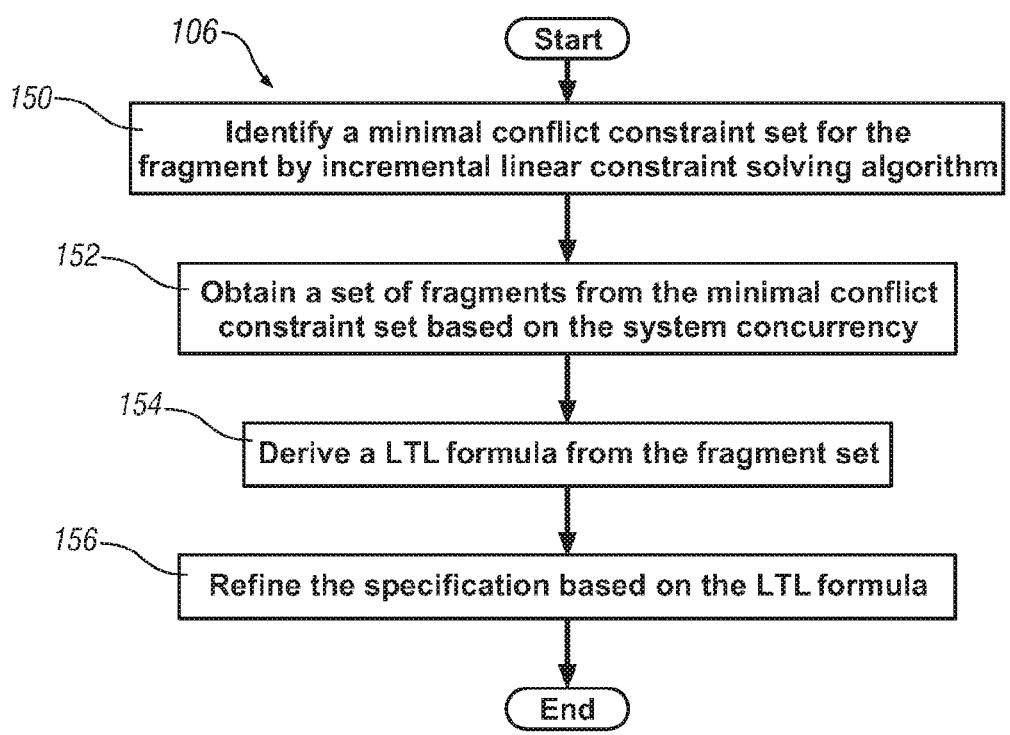
FIG. 8 is a flow-chart illustrating a state diagram depicting a process identifying of fragment of an invalid counterexample for concurrent systems.

FIGS. 2 and 8 illustrate the process of specification refinement. Shown in more detail in FIG. 8 is a flowchart (106) illustrated in accordance with an embodiment of the invention. A minimal conflict constraint set for the counterexample fragment is identified (150) by incremental linear constraint solving algorithms. For concurrent systems, identify a minimal conflict constraint set $Set_{min}$ from the constraint set $Set_{frag}$ for the given counterexample fragment by incremental linear constraint solving algorithms, where $Set_{min}$ relates to a set of fragments based on the system concurrency (152); for non-concurrent systems, $Set_{min} = Set_{frag}$ and the fragment set associated with $Set_{min}$ includes only the counterexample fragment identified.

A set of fragments is obtained from the minimal conflict constraint set based on the system concurrency and are used to derive a LTL formula (154). The LTL formula $f_{frag}$ is used to encode all the system state traces that contain one fragment in the fragment set before reaching any bad state.

The specification is then refined (156) based on the LTL formula. Thus, the specification is refined from f to $f \vee f_{frag}$.

In one embodiment of the invention, the fragment $frag_2$ identified in FIG. 7 is used to refine the LTL specification as follows:

$f_{refine} = f_{init} \vee f_{frag}$.
$f_{init} = G \neg Bad$
$f_{frag} = \neg Bad \cup (\text{Execute} \neg X Bad)$.

The invention discloses various systems and methods for performing a reachability analysis of linear hybrid automata. The reachability of linear hybrid automata is equivalent to the one of linear transition systems, which are purely discrete transition systems that do not have any continuous time dynamics by differential equations. A counterexample fragment based specification refinement approach provides for the reachability analysis of linear transition systems. The counterexample validation problem reduces to the linear constraint satisfaction problem and may be solved by using methods like Linear Programming.

A process having a complexity of $O(\log(n))^*LP$ is provided for the counterexample fragment identification, where n is the length of the counterexample and LP is the complexity of the counterexample validation by using Linear Programming. A new approach for the specification refinement is also disclosed. For concurrent systems, a set of fragments is obtained from one counterexample fragment based on the concurrency of the system, and a LTL formula is used to encode the system traces that contain one fragment in the fragment set before reaching any bad state. The system specification is then refined based on the LTL formula. As a result, the number of repeatedly performing the steps of model checking, counterexample validation, fragment identification, and specification refinement is largely reduced.

The invention has been described with specific reference to the exemplary embodiments and modifications thereto. Further modifications and alterations may occur to others upon reading and understanding the specification. It is intended to include all such modifications and alterations insofar as they come within the scope of the invention.

The invention claimed is:

1. Method for verifying linear hybrid automaton, the method comprising:
   using a reachability analysis of a linear transition system (LTS) to verify a linear hybrid automata (LHA) system;
   generating initial abstract model based on an original Linear-Time Temporal Logic (LTL) specification;
   validating a counterexample using an approach of linear constraints satisfaction;
   identifying a fragment in the counterexample by iteratively applying the approach of linear constraints satisfaction; and
   refining the original LTL specification based on the fragment derived.

2. The method of claim 1, wherein generating an initial abstract model comprises:
   transferring the LHA into the LTS, wherein the LTS is a discrete transition graph in combination with a set of real variables that consists of discrete dynamics that are modeled by discrete transitions, wherein each discrete transition has a linear transition relation function that relates the real variables before and after each discrete transition, wherein the abstract model includes the LTS discrete transition graph and does not include representations of reachable state sets.

3. The method of claim 2, further comprising:
   checking the abstract model for reachability of a set of bad locations;
   determining that the set of bad locations is not reachable in the LTS if the abstract model passes the abstract model checking; and
   generating a counterexample if the abstract model does not pass the model checking.

4. The method of claim 3, further comprising terminating the method for verifying linear hybrid automaton if the abstract model satisfies the LTL specification.

5. The method of claim 3, further comprising:
   checking the feasibility of the counterexample in the LTS to determine whether a corresponding run exists in the LTS for the counterexample.

6. The method of claim 5, further comprising:
   generating a linear constraint satisfaction problem for checking if a corresponding run exists in the LTS;
   solving the linear constraint satisfaction problem to determine if a run of bad location sets exists in the LTS for the counterexample; and
   using the run as a concrete counterexample if the bad location sets is reachable in the run of the LTS, wherein the run of bad location sets is reachable in the LTS if the LTL specification is not satisfied.

7. The method of claim 6, further comprising:
   identifying a fragment in an invalid counterexample that is infeasible in the LTS; and
   refining the system specification based on the invalid counterexample fragment.

8. The method of claim 3, further comprising:
   using an approach of linear constraints to validate the counterexample if the LTL specification is not satisfied by the abstract model;
   determining whether the counterexample is feasible; and
   terminating the method for verifying linear hybrid automaton if the counterexample is feasible in the LTS.

9. The method of claim 1, wherein identifying a fragment in the counterexample by iteratively applying the approach of linear constraints satisfaction comprises:
   dividing the identified fragment into a first and a second sub fragment; and
   determining if both the first and second sub fragments are valid.

10. The method of claim 9, further comprising:
    randomly picking an invalid sub fragment from one of the first and second sub fragments; and
    determining if the randomly picked invalid sub fragment has a length equal to one.

11. The method of claim 9, further comprising:
    identifying a fragment in an invalid counterexample that is infeasible in the LTS repeatedly until the first and the second sub fragments are both valid or until the length of an invalid fragment equals one.

12. The method of claim 1, further comprising:
    refining the specification to include the initial specification and the specification based on the fragment identified such that each run in the abstract model either does not contain any bad state location or contains the fragment before reaching a bad location.

13. The method of claim 12, wherein refining the specification further comprises:
    identifying a minimal conflict constraint set for the counterexample fragment identified.

14. The method of claim 13, further comprising:
    using incremental linear constraint solving algorithms to identify the minimal conflict constraint set.

15. The method of claim 14, further comprising:
    deriving a set of fragments based on the minimal conflict constraint set and a concurrency of concurrent systems.

16. The method of claim 15, further comprising:
    using a LTL formula to encode a plurality of system traces that contain a fragment from the set of fragments before reaching any bad locations.

17. The method of claim 15, further comprising:
    refining the original LTL specification by adding the LTL formula derived from the set of fragmented such that either the original LTL specification is satisfied or the added LTL specification is satisfied.

18. The method of claim 1, further comprising:
    using the reachability analysis to verify an embedded control system.

19. The method of claim 1, further comprising:
    implementing the reachability analysis to verify that the linear hybrid automata system on a software tool that is executed on a computer system having associated microprocessor means including an arithmetic processor and associated memory means.

20. Method for verifying linear hybrid automaton, the method comprising:
    generating an initial abstract model based on an original Linear-Time Temporal Logic (LTL) specification;
    validating a counterexample using an approach of linear constraints satisfaction;
    identifying a fragment in the counterexample by iteratively applying the approach of linear constraints satisfaction in a predefined number of times; and
    refining the original LTL specification based on the fragment derived.

* * * * *